United States Patent [19]

Charlebois et al.

[11] Patent Number: 4,591,330

[45] Date of Patent: May 27, 1986

[54] MOULDING EQUIPMENT

[75] Inventors: Leonard J. Charlebois, Kanata; Peter A. Brown, Ottawa, both of Canada

[73] Assignee: Northern Telecom Limited, Montreal, Canada

[21] Appl. No.: 668,599

[22] Filed: Nov. 5, 1984

[51] Int. Cl.$^4$ .............................................. B29C 45/03
[52] U.S. Cl. ..................... 425/567; 425/117; 425/122; 425/127; 425/129 R
[58] Field of Search .............. 156/49, 50, 56; 29/460, 29/527.2, 527.3, 527.4; 425/117, 127, 129 R, 567, 122; 403/330; 285/310, 312, 320

[56]  References Cited

U.S. PATENT DOCUMENTS

| | | | |
|---|---|---|---|
| 1,646,873 | 10/1927 | Richards | 285/320 |
| 1,889,133 | 11/1932 | Pfefferle | 285/320 |
| 2,770,474 | 11/1956 | Krapp | 285/320 |
| 2,976,400 | 3/1961 | Steber | 403/330 |
| 3,526,417 | 9/1970 | Kumiller | 285/310 |
| 3,982,563 | 9/1976 | Kowal et al. | 285/320 |
| 4,091,062 | 5/1978 | Nelson | 156/49 |
| 4,111,470 | 9/1978 | Welcker | 285/320 |

Primary Examiner—Willard E. Hoag
Attorney, Agent, or Firm—R. J. Austin

[57] ABSTRACT

Moulding equipment in which cooperable male and female connectors of a mould and a dispensing container for mouldable material have means to lock them together. This includes a locking member which is manually moveable in pivotal fashion upon one connector into and out of a locking position with the other connector.

Opposing surfaces of the locking member and the other connector relatively move across each other during movement of the locking member while offering sufficiently low resistance to movement to allow for manual operation. During transfer of the material into the mould, the opposing surfaces are urged together by moulding pressure to increase resistance to movement of the locking member out of the locking position. In preferred constructions, the locking member has a cam surface which ensures the need for a progressively increasing unlocking force to enable release of the locking member during transfer of the mouldable material.

3 Claims, 7 Drawing Figures

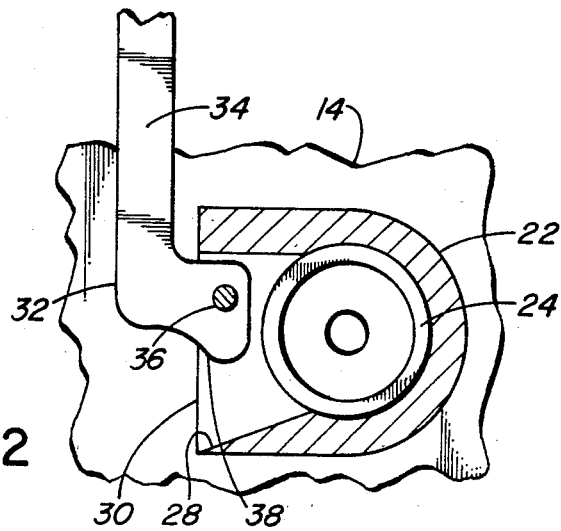
FIG. 2
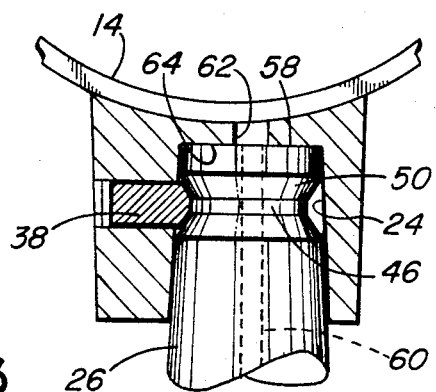
FIG. 3
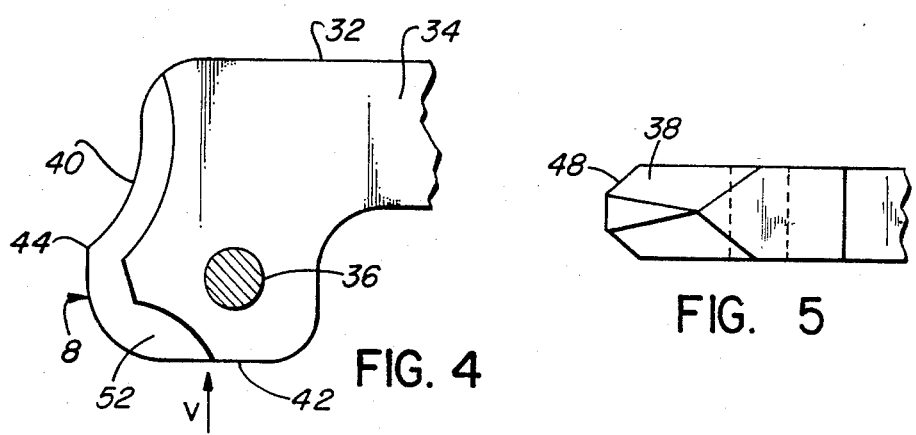
FIG. 4
FIG. 5

MOULDING EQUIPMENT

This invention relates to moulding equipment.

In some industries, it is necessary for operators working in the field to seal articles, for instance, against the effects of ambient conditions. Various methods of sealing have been suggested and one which has recently been proposed and has been successfully used is the method of sealing by providing a mould which surrounds the article and an encapsulation is formed around the article by transferring heated molten plastics material into the mould cavity and allowing it to cool and set. Encapsulations formed by moulding techniques have successfully been employed in the telecommunications cable industry. In the telecommunications cable industry, it is necessary to form splices in the field and this involves cutting into a cable to enable the conductors to be reached. The conductors are then severed and connected to other wires leading from the cable. It is then necessary to seal around the area of the splice to prevent connections between the conductors from becoming adversely affected by atmospheric conditions, such as dampness, or affected by moisture conditions such as is found surrounding underground cables. The use of polymeric materials, as moulded encapsulations around such splices, has simplified previous encapsulation procedures and also has cheapened the encapsulation process.

Successful methods of sealing, including moulded encapsulations, have been described in U.S. Pat. Nos. 4,152,539 granted May 1, 1979, and 4,322,573 granted Mar. 13, 1982, both patents being in the name of Leonard J. Charlebois. Methods of sealing by the forming of moulded encapsulations around cable splices, have been described in copending U.S. patent application No. 527,759, filed Aug. 30, 1983 and corresponding Canadian application No. 435,860, filed Sept. 1, 1983, entitled "Methods and Apparatus for Sealing Articles", in the names of Leonard J. Charlebois, Renato Mariani and Fred A. Huszarik. In a further application filed concurrently with this application and entitled "Encapsulating Articles", in the name of L. J. Charlebois, an alternative method for forming an encapsulation is discussed.

In all of the above patents and applications referred to, a moulding operation for providing an encapsulation involves the necessary use of a mould for surrounding the spliced area of cable and also some form of dispensing container for dispensing molten polymeric material into the mould. When operating in the field as distinct from in a factory environment, various problems need to be overcome in the provision of a moulded encapsulation. These problems involve the provision of molten plastics material at the site and at the required time, increasing the speed of flow of the material into the mould to overcome certain layering problems in the finished encapsulation and also the provision of suitable dispensing containers. These containers, while operating at the required speed, are sufficiently light in weight to enable them to be carried and to be operated manually.

A further problem which needs to be overcome is the difficulty of interconnecting a dispensing container with a mould in a field environment to enable the connection to be performed manually and also to ensure that the connection between the two pieces of equipment is guaranteed during the transfer of the hot molten material into the mould cavity. It is known that present moulding equipment, which is mould cavity. It is known that present moulding equipment, which is normally used in factory environments, has means for holding moulds and dispensing containers (such as extruders) in assembled condition. Such holding means are of elaborate construction, are machine operated, and/or are otherwise too difficult or impossible to operate manually in the field. To enable encapsulations around cable splices to be performed successfully in the field, therefore, it is not only necessary to provide lightweight equipment which will operate at a required speed, but it is also necessary to be able to assemble and disassemble the equipment easily and relatively quickly without endangering the moulding operation.

The present invention provides moulding equipment comprising a mould and dispensing container which are capable of being connected together manually without difficulty and will remain assembled during transfer of molten material into the mould cavity.

Accordingly, the present invention provides moulding equipment comprising a mould and a dispensing container for dispensing molten moulding material into the mould, the mould and container having cooperable male and female connectors to connect them together for allowing transfer of pressurized fluid from the container into the mould, one of the connectors carrying a locking member for manual pivotal movement into and out of a locking position with the other connector, the locking member and said other connector having surfaces which oppose each other and are relatively movable one across the other during movement of the locking member into and out of the locking position while said surfaces normally offer sufficiently low resistance to movement of the locking member to allow for manual operation, and during said transfer said surfaces are urged together by a force applied by internal pressure to provide or increase resistance to relative sliding movement of the surfaces across each other during movement of the locking member out of the locking position.

The above equipment according to the invention is useful in field operations but may also be used under factory environments. The locking member is simple to operate and frictional contact between the opposing surfaces during a moulding operation prevents manual operation of the locking member to disassemble the equipment.

Conveniently, the locking member comprises a cam which engages with a recess of the other connector, with a surface of the cam providing one of the opposing surfaces. The cam surface is preferably inclined to the axis of the two connectors and the opposing surface of the other connector has a similarly inclined opposing surface.

In a preferred arrangement, the opposing surfaces are provided so that during any tendency for the locking member to move out of the locking position during transfer of molten material into the mould, then the resistance offered by the engagement of the opposing surfaces increases as the locking member moves from its locking position. Such an arrangement ensures that the locking member remains in its least loaded position, i.e. in the locking position, and minimizes any tendency for it to move out of that position.

The invention further includes moulding equipment comprising a mould and a dispensing container for dispensing molten mouldable material into the mould, the mould and container having cooperable male and female connectors to connect them together for allowing for transfer of pressurized fluid from the container into the mould, the female connector having a slot extending radially from its outer periphery to a central orifice for accepting the male connector, the slot pivotally carrying a locking member which is pivotally movable through the slot into and out of a locking position in which the locking member has a locking cam projecting radially into the orifice; and the male connector formed with a circumferential recess and being insertable into the orifice with the recess aligned with the cam for movement of the cam into the recess and, during movement of the locking member into the locking position, surfaces of the locking member and the male connector oppose each other axially of the connectors and move relatively one across the other while normally offering sufficiently low resistance to movement of the locking member so as to allow for manual operation, and during transfer of pressurized fluid, said surfaces are urged together axially of the connectors by a force applied by internal fluid pressure to provide or increase resistance to relative movement of the surfaces and increase resistance to movement of the locking member out of the locking position.

One embodiment of the invention will now be described, by way of example, with reference to the accompanying drawings in which:-

FIG. 2 is an end view of a connector of the mould for connecting it to the dispensing container;

FIG. 3 is a side elevational view partly in cross-section of the connector of the dispensing container assembled to the mould connector;

FIG. 4 is a side elevational enlarged view of a locking member of the mould connector;

FIG. 5 is a view in the direction of arrow V in FIG. 4 of the locking member;

Figure 1:
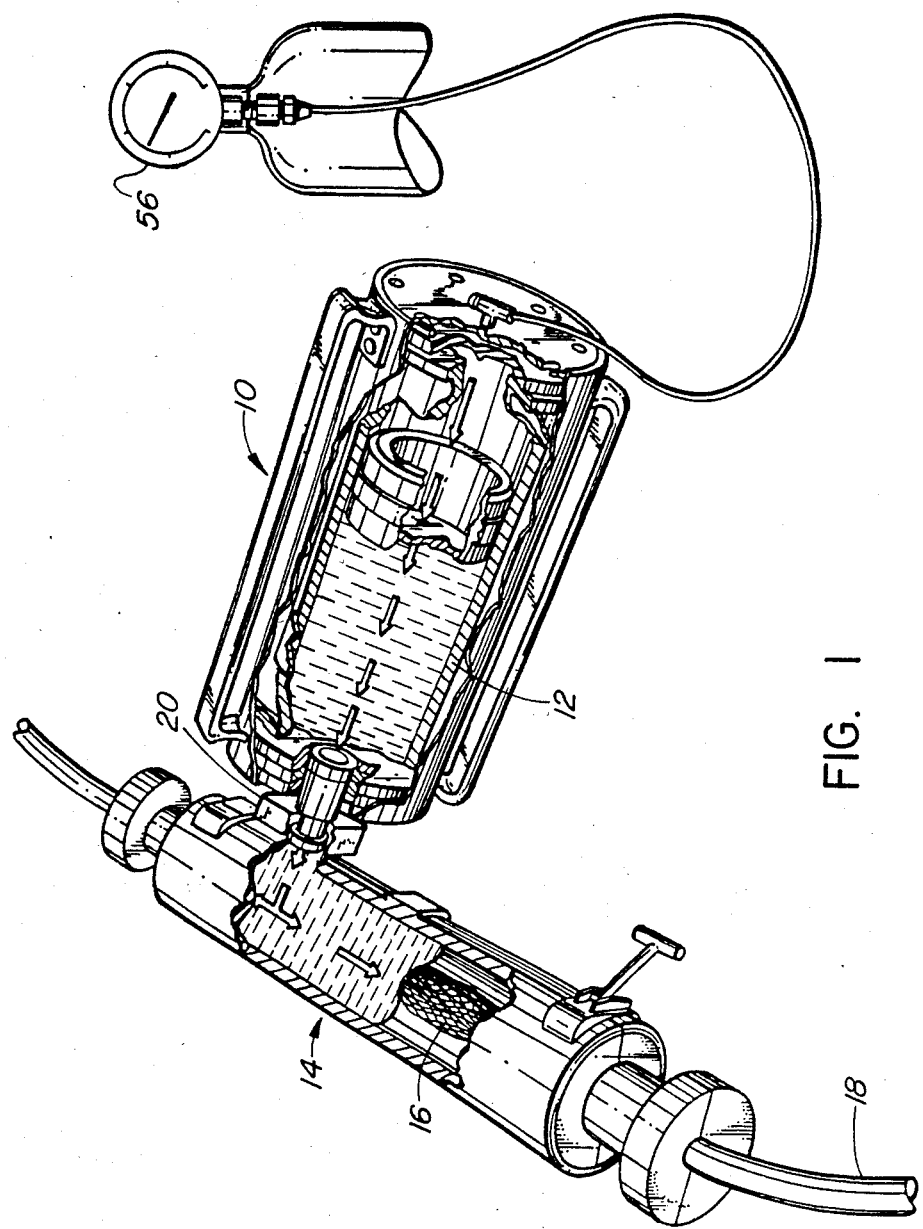
FIG. 1 is an isometric view, partly in cross-section, showing a dispensing container attached to a mould and showing molten plastics material being injected into the mould.

As shown in FIG. 1, a dispensing container 10 contains a quantity of molten plastics material 12 which is being dispensed into a mould 14 for forming an encapsulation around a spliced region 16 of a cable 18. The molten plastics material may be provided by the method described in a patent application filed concurrently herewith, entitled 37 Encapsulating Articles", in the name of Leonard J. Charlebois, or it may be provided by the method described in U.S. patent application Ser. No. 527,759, filed Aug. 30, 1983 and corresponding Canadian patent application Ser. No. 435,860, filed Sept. 1, 1983, entitled "Methods and Apparatus for Sealing Articles", in the name of Leonard J. Charlebois, Renato Mariani and Fred A. Huszarik.

The splice encapsulation procedure is performed in situ after the cable has been inserted within the ground. Thus, the total procedure is performed below ground level within a pit dug expressly for the purpose and only sufficiently large to contain the equipment and an operator. Under the circumstances, it is imperative that the equipment is easy to operate manually and is of relatively light weight to enable it to be carried easily by the operator. The present invention provides a locking arrangement between the mould and the dispensing container, which is in line with ease of operation under such difficult conditions.

The dispensing container and the mould are connected together in the region shown at 20 in FIG. 1. Connectors at this region of the mould and container assembly are constructed in the following manner.

Figure 6:
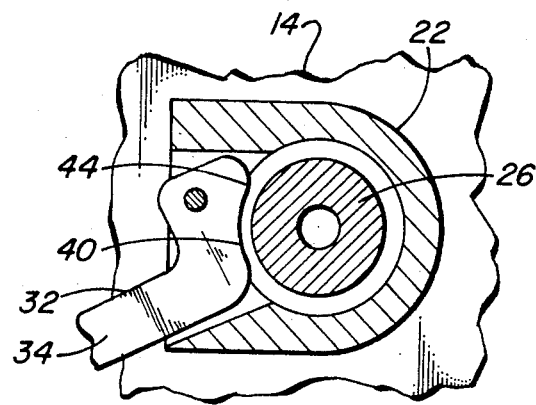
FIG. 6 is a cross-sectional view through the assembly of the connectors showing the locking member in a locking position.

The mould has a female connector 22, as shown particularly in FIG. 2. The connector 22 has a central circular tapered orifice 24 for accepting a male connector 26 (see FIG. 3), as will be described, and is also formed with a radially extending slot 28 which opens at the outer periphery 30 of the connector 22 and also into the orifice 24. Within the slot 28 is pivotally mounted a locking member 32. This locking member is manually operable and has a handle 34 extending outwardly from the slot and is pivotted by a pin 36 passing through the slot and secured to the connector 22. The locking member has a cam 38 facing inwardly towards the orifice 24 during operation of the member, as will be described. As shown in FIG. 4, the cam 38 has a concave surface area 40 which, when the locking member is in a locking position as shown in FIG. 6, has a center of radius substantially coinciding with the axis of the orifice 24. In this position of the locking member, the concave cam surface 40 projects into the orifice 24, as shown by FIG. 6.

In an unlocked position of the locking member, as shown in FIG. 2, the cam surface does not project into the orifice 24 because the cam surface at position 42 lies closer to the pivotal position of the pivotting pin 36. To move the locking member out of its locking position shown in FIG. 6 into the position shown in FIG. 2 entails movement of the concave region 40 in such a way that a trailing end 44 of the concave region moves slightly further into the orifice 24 to enable the unlocked position to be achieved.

As shown in FIG. 3, the male connector 26 fits snugly within the orifice 24 and has an annular recess 46 which is aligned with the slot 30. This recess 46 is provided to receive the cam 38 as the locking member moves into the locking position as shown by FIG. 3.

As shown by FIGS. 3 and 5, both the cam 38 and the recess 46 are formed with oppositely inclined surfaces. One of the surfaces 48 of the cam opposes the inclined surface 50 of the recess 46 to hold the two connectors assembled together as will be described. Also, as shown in FIG. 4, the inclined surfaces in the region 52 of the cam diverge at a smaller angle such as to provide a lead for the cam into the recess 46 as the locking member is moved from the unlocked to the locking position.

In use of the moulding equipment described above, with the dispensing container containing molten plastics material for transfer into the mould, the two connectors are assembled together with the locking member in the unlocked position shown in FIG. 2. The handle is then turned anticlockwise into the position shown in FIG. 6 during which the cam moves into the orifice 24 and hence into the recess 46. During this movement, the inclined opposing surfaces 48 and 50 move relative to each other to allow the locking position to be assumed by the locking member. The configuration and size of the surface of the cam 38 and the recess 46 is such that little or no resistance is provided by the movement of the surface 48 across the surface 50 to the locating of the locking member in its locking position. A slight clearance may be provided between the cam and the surfaces of the recess so that there is complete freedom of movement of the locking member before and after transfer of the molten material from the dispensing container into the mould.

With the locking member in the locking position shown by FIG. 6, the molten material is then transferred from the dispensing container into the mould. This transfer operation takes place in this embodiment, in the manner described in a patent application filed concurrently with this application, entitled "Encapsulating Articles", in the name of Leonard J. Charlebois. As described in that application, non-molten plastics material is placed directly in the dispensing container and is then heated to make it molten. After allowing gases in the molten material to escape, the container is placed in communication with the mould cavity and a piston is moved along a reservoir within the container to dispense the material through the connectors 22 and 26. Movement of the piston is created by pressurized air issuing behind the piston from a high pressure source 56, as shown in FIG. 1.

Figure 7:
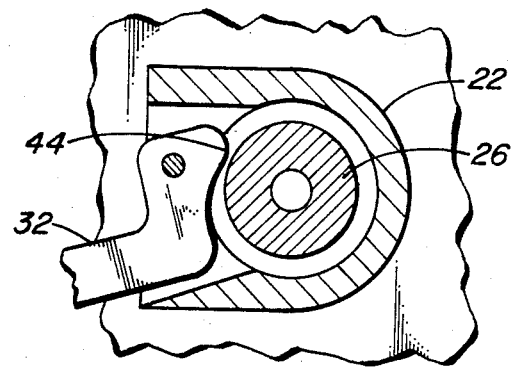
FIG. 7 is a view similar to FIG. 6 showing the relative position of the parts during any tendency for the locking member to move out of its locking position.

As the molten material is being dispensed into the mould, as shown in FIG. 1, there is a build-up in internal pressure through the connectors and into the mould cavity. This pressure build-up operates against the end surface 58 of the male connector and thereby creates an axial load between the two connectors. This load is imparted into the connector 22 from connector 26 through the opposing surfaces 48 and 50. This load, which is dependent upon the amount of pressure in the moulding equipment during transfer into the mould cavity, acts to resist any tendency for the locking member to move or to be moved out of its locking position. In fact, in the embodiment being described which is for use with a low pressure moulding procedure, the pressure within the mould during filling is of the order of around 10 pounds per square inch. There is, therefore, only a slight axial pressure acting between the two opposing surfaces 48 and 50 and it is possible to manually move the locking member by the handle 34 slightly around the pin 36 while retaining it in its locking position. In this position shown by FIGS. 3 and 6, the arcuate part 40 of the cam lies within the recess 46 and extends partly around the circumference of the connector 26. The arcuate part 40 is normally a loose fit within the recess 46 and slight pressure upon the surfaces 48 and 50 may still allow for movement of the male connector to close any clearance between the surfaces and hold them firmly together. However, as described, the trailing end 44 of the concave part 40 of the cam lies further from the pivot position 36. Thus, if there is any tendency to move the locking member out of its locking position by movement of the trailing end 44 through the recess 46, (as shown by FIG. 7), then there is a greater binding action between the surfaces 48 and 50 than is the case with the locking member in its locking position. Hence, there is an increase in loading between the locking member and the connector 26 as the mould is being filled and it is easier for the locking member to retain its locking position than for it to move out of the locking position towards the position shown in FIG. 2. Thus, it is natural for the locking member to stay in the locking position during the mould filling procedure.

After the moulding procedure is finished and pressure is removed from the piston, then the pressure within the system is reduced thereby allowing for manual operation of the locking member to return it to its unlocked position and allow the dispensing container and the mould to be disassembled before removal of the moulded encapsulation.

It should be borne in mind that the axial load placed between the two connectors is not dependent solely upon pressure being exerted upon the surface 58 of the male connector. This would occur if the diameter of a flow passage 60 of the male connector had a smaller diameter than that of the flow passage 62 (as shown in FIG. 3). In an alternative arrangement (not shown) in which the diameter of flow passage 60 is larger than that of passage 62, the pressure build-up operates against the end surface 64 of the female connector 22, thereby urging the surfaces 48 and 50 towards each other.

As can be seen from the above description, the moulding equipment having the locking arrangement described and according to the invention, allows for ease of manual operation in difficult operating conditions such as within a pit in the ground during a cable encapsulation process. Further to this, little or no force is required to assemble the mould and dispensing container together and the moulding operation itself ensures that sufficient pressure is built up internally to retain the locking member in its locked position, thereby preventing any accidental removal of the dispensing container from the mould as the cavity is being filled. The two parts of the moulding equipment are thus easily and quickly assembled and disassembled and the internal pressure created during moulding provides a safety feature in retaining the locking member in its locking position.

What is claimed is:

1. Moulding equipment comprising a mould and a dispensing container for dispensing molten mouldable material into the mould, the mould and container having cooperable male and female connectors to connect them together for allowing transfer of pressurized fluid from the container into the mould, the female connector having a slot extending radially from its outer periphery to a central orifice and with the length of the slot lying in a circumferential direction of the orifice, the slot pivotally carrying a locking member about an axis parallel to the axis of the central orifice, the locking member being pivotally movable through the slot into and out of a locking position in which the locking member has a locking cam projecting radially into the orifice; and the male connector formed with a circumferential recess and being insertable into the orifice with the recess aligned with the cam for movement of the cam into the recess and, during movement of the locking member into the locking position, surfaces of the cam and the circumferential recess oppose each other axially of the connectors and move relatively one across the other while normally offering sufficiently low resistance to movement of the locking member so as to allow for manual operation, and during transfer of pressurized fluid, said surfaces are urged together axially of the connectors by a force applied by internal fluid pressure to provide or increase resistance to relative movement of the surfaces, thereby to increase resistance to movement of the locking member out of the locking position.

2. Moulding equipment according to claim 1 wherein the cam and the recess have opposing surfaces which are inclined to the axial direction of the connectors.

3. Moulding equipment according to claim 1 wherein the locking cam surface is shaped to coact with the surface of the circumferential recess to ensure that a progressively increasing unlocking force is required during transfer of molten material into the mould to move the locking member out of the locking position.

* * * * *